United States Patent
Schierling et al.

(10) Patent No.: US 8,208,813 B2
(45) Date of Patent: Jun. 26, 2012

(54) MACHINE WITH OPTICAL COMMUNICATION FROM A FIRST MACHINE PART TO A SECOND MACHINE PART WHICH ROTATES RELATIVE TO THE FIRST MACHINE PART

(75) Inventors: Hubert Schierling, Erlangen (DE); Richard Schmidt, Baiersdorf (DE); Ulrich Wetzel, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 660 days.

(21) Appl. No.: 12/316,019

(22) Filed: Dec. 9, 2008

(65) Prior Publication Data

US 2009/0154936 A1 Jun. 18, 2009

(30) Foreign Application Priority Data

Dec. 17, 2007 (EP) .................... 07024402

(51) Int. Cl.
*H04B 10/10* (2006.01)
*H04B 10/22* (2006.01)
(52) U.S. Cl. ...................................... 398/114
(58) Field of Classification Search ............... 398/114
See application file for complete search history.

(56) References Cited

U.S. PATENT DOCUMENTS

| 4,753,506 | A | | 6/1988 | Einhorn et al. |
| 5,535,033 | A | * | 7/1996 | Guempelein et al. ......... 398/114 |
| 5,818,188 | A | * | 10/1998 | Hirai et al. .................... 318/480 |
| 6,043,916 | A | | 3/2000 | Poisel et al. |
| 7,099,532 | B2 | | 8/2006 | Schilling |
| 2004/0062344 | A1 | | 4/2004 | Popescu et al. |
| 2005/0013535 | A1 | | 1/2005 | Popescu |

FOREIGN PATENT DOCUMENTS

| AU | 9735369 A | 1/1998 |
| DE | 19625870 A1 | 1/1998 |
| DE | 10222221 A1 | 3/2004 |

OTHER PUBLICATIONS

Lichtleiter (http://lexikon.meyers.de/wissen/Lichtleiter+%28Sachartikel%29; Others; 2003.
Communication from European Patent Office citing references, pp. 1-5.

* cited by examiner

*Primary Examiner* — Leslie Pascal

(57) ABSTRACT

To enable signals to be transmitted from a fixed machine part to a machine part opposite same which rotates on a hollow shaft or vice versa, light must be able to be transmitted or received over the entire circumference. This is achieved by using an optical waveguide which, unlike conventional optical waveguides, is designed to couple out some of the light passing through it and, conversely, to allow light to enter, at any locations on its circumference.

10 Claims, 4 Drawing Sheets

MACHINE WITH OPTICAL COMMUNICATION FROM A FIRST MACHINE PART TO A SECOND MACHINE PART WHICH ROTATES RELATIVE TO THE FIRST MACHINE PART

CROSS REFERENCE TO RELATED APPLICATIONS

This application claims priority of European Patent Office application No. 07024402.5 EP filed Dec. 17, 2007, which is incorporated by reference herein in its entirety.

FIELD OF INVENTION

The invention relates to a machine as claimed in the claims.

BACKGROUND OF INVENTION

The machine therefore has a first machine part and a second machine part, and the second machine part can be rotated relative to the first machine part about an axis of rotation. Data signals are optically transmitted, i.e. an optical signal transmitting device is disposed on one machine part and a device for receiving optical signals is disposed on the other machine part. It is rarely possible to dispose an optical transmitter and an optical receiver precisely in the axis of rotation. If optical signals are now to travel from an optical transmitter to an optical receiver outside of the axis of rotation, the problem is that the optical signals must be transmitted at any angular positions of the second machine part. This problem has hitherto been solved by providing a plurality of light sources and ensuring by constructional means that the light rays emitted by the light sources spread out to form a luminous ring at a particular location in the machine. The optical receiver can be a point detector. When the rotating machine part rotates, it is then always ensured that light passes from the optical transmitter to the optical receiver.

SUMMARY OF INVENTION

Due to the fact that the light rays from the optical sources must be spread in order to form a luminous ring, a certain distance must be provided for the ray path. This means that, in the machine, space must be provided for a cylinder of a particular length in which the light is guided until it is emitted as a ring on an edge of the cylinder. The plurality of light sources also takes up a relatively large amount of space in the machine.

An object of the invention is to provide a machine of the generic type mentioned in the introduction which is of relatively short construction (referred to the axis of rotation) and therefore of compact design. In particular, the machine shall be able to incorporate a hollow shaft, i.e. for the transmission of data signals beyond the axis of rotation.

This object is achieved by a machine having the features set forth in the claims. One of the machine parts is thus provided with an annular optical waveguide which is disposed concentrically with respect to the axis of rotation and has the characteristic of allowing some of the coupled-in light to emerge or, conversely, of allowing light to enter from outside. The design and arrangement of the annular optical waveguide must be such that the light emerging from the optical waveguide reaches the other machine part, i.e. the part where the optical waveguide is not disposed, or that the light emitted by the other machine part can enter.

According to an explicit embodiment of the invention, the optical waveguide is part of the device for receiving optical signals. However, in a particularly simple embodiment the optical waveguide is part of the optical signal transmitting device, said optical signal transmitting device comprising a light source which can couple light in at a coupling point.

As a result of the optical waveguide being provided there is no necessity to use a plurality of light sources. No space is required for the spreading of the light ray emitted by the light source. In fact the optical waveguide and associated light source can be disposed in very close axial proximity to an optical signal receiving device, so that the machine is of short construction.

There are different methods of ensuring that light emerges from the optical waveguide. An exit point can be specified in a defined manner whereby, in the case of an optical waveguide comprising in per se known manner a core and a cladding with the material constituting the core having a lower refractive index than the material constituting the cladding, the cladding is broken all round the circumference of the optical waveguide ring (i.e. not over the cross-section of the optical waveguide, but around the circumference defined concentrically to the axis of rotation). This can be particularly simply implemented as a continuous slit in the cladding.

In another embodiment, a plurality of scattering centers is implemented in the optical waveguide. These are designed to diffract the light not randomly, but in a predefined direction from the optical waveguide and are therefore oriented in a predefined manner in the optical waveguide. Such scattering centers can be implanted in an optical waveguide core e.g. using a laser.

Finally it is also possible to provide one side of the optical waveguide with indentations which cause the light normally reflected by that side to be sent out obliquely, namely toward the side of the optical waveguide opposite the indentations, where the machine part on which the optical waveguide is not disposed must be arranged, i.e. generally the machine part incorporating the receiving device.

The optical signals from the optical signal transmitting device can be transmitted axially (with respect to the axis of rotation of the second machine part) to the receiving device in the conventional manner. However, using the optical waveguide also makes it possible, e.g. by suitably positioning the breaks in the cladding of the optical waveguide, to transmit the light radially, i.e. so that light is coupled out over the entire circumference of the optical waveguide ring. The non-rotating machine part can then be disposed radially around the rotating machine part, thereby enabling the machine to be of particularly short construction in the axial direction.

As already mentioned, the invention is particularly suitable in the case where the second machine part rotates via a hollow shaft, the optical waveguide then only needing to surround the hollow shaft.

BRIEF DESCRIPTION OF THE DRAWINGS

Particular embodiments of the invention will now be described with reference to the accompanying drawings in which.

DETAILED DESCRIPTION OF INVENTION

Figure 1:
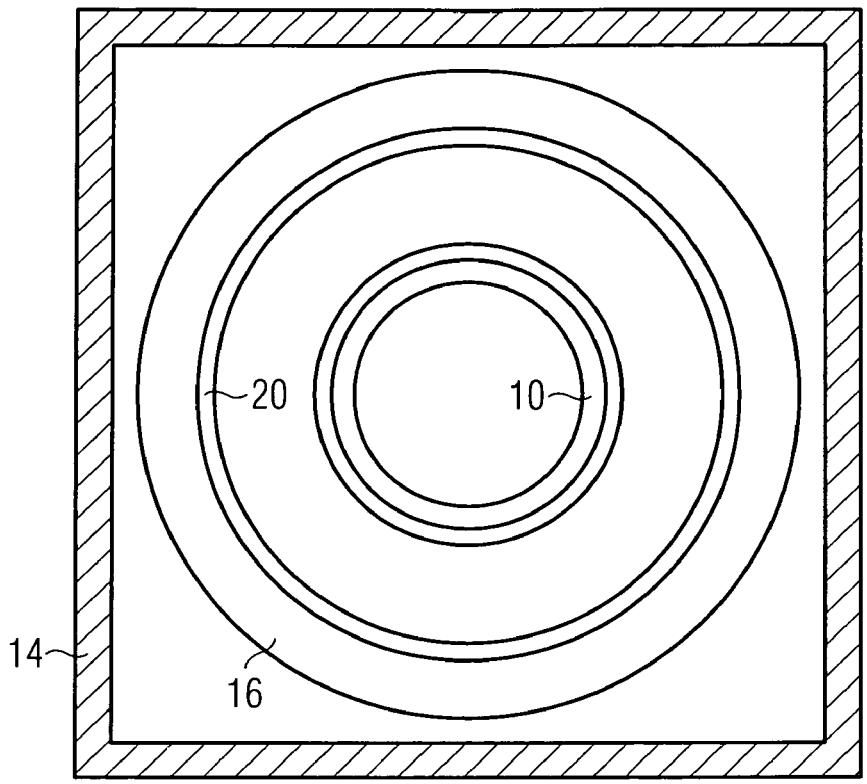
FIG. 1 shows a plan view of one of two machine parts of a machine.
Figure 2:
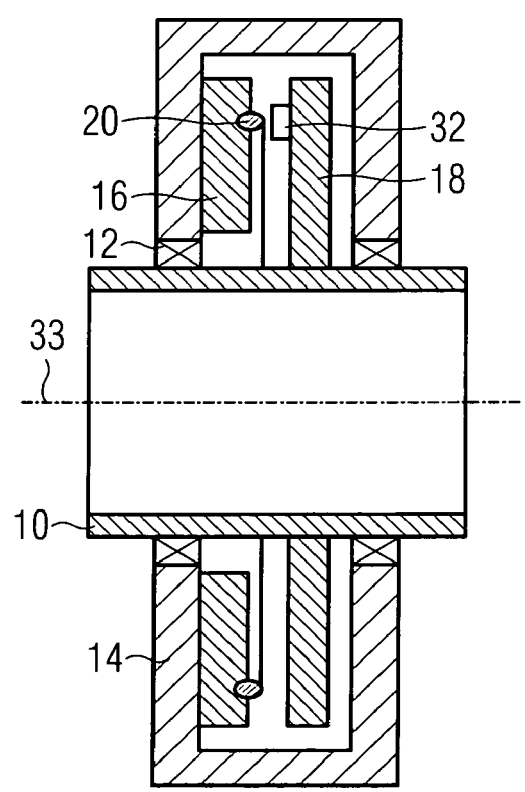
FIG. 2 shows a cross-sectional side view of a machine.

In a machine, part of which is shown in FIGS. 1 and 2, data is transmitted from a fixed component to a component which rotates relative to said fixed component. The rotation takes place in particular via a hollow shaft 10 which is mounted via bearings 12 in a housing 14. Fixedly connected to the housing 14 is a mount 16 for devices used for electronic data processing. The mount 16 can be implemented as a circuit board, or the electronic components can be provided on a ceramic substrate. Corresponding to the mount 16, which is fixed to the housing 14, is another mount 18 which is coupled to the hollow shaft 10 and rotates with same. An optical signal transmitting device is disposed on the mount 16, while a device for receiving optical signals is disposed on the mount 18.

The optical signal transmitting device and the receiving device must be suitably arranged with respect to one another such that data signals reach the receiver at any angle of rotation of the hollow shaft 10. In the embodiments shown in FIGS. 1 and 2, this is effected in such a manner that the optical signal transmitting device emits light over its entire circumference, whereas a point optical receiver is used. However, the invention can also be similarly applied to a point light source and an annular detector. In the present case, light is emitted from an optical waveguide 20 into which light is coupled by a light source not shown in FIGS. 1 and 2. Conventional optical waveguides are designed so that no light escapes from them. In the present case, a conventional optical waveguide is modified such that at least some of the light coupled in by the light source does actually escape, a suitable measure being taken to ensure that light escapes over its entire circumference. There is therefore no angle at which no light escapes from the optical waveguide 20.

Figure 3:
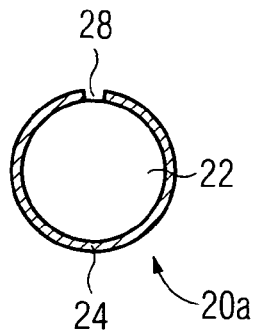
FIGS. 3 and 4 illustrate a first embodiment of an optical waveguide in different cross-sections.
Figure 4:
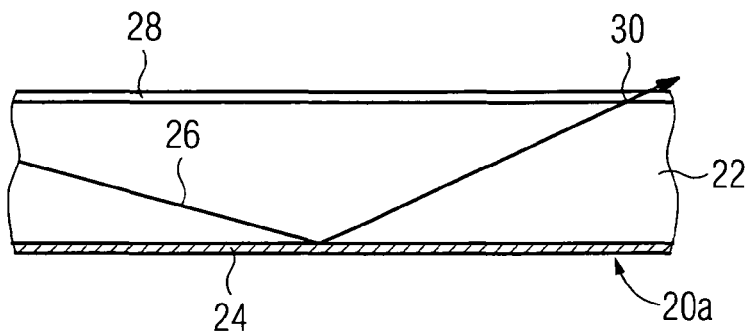

There are various ways of implementing this emission of light from an optical waveguide. FIG. 3 shows a cross-section through an optical waveguide and FIG. 4 the same optical waveguide in untwisted form, wherein the horizontal axis constitutes the angle. The optical waveguide 20a from FIG. 3 or FIG. 4 has a core 22 which is made e.g. of polymer fiber and is surrounded by a cladding 24 having a higher refractive index than the polymer fiber. Because of the higher refractive index of the cladding, a light ray 26 is reflected by the cladding 24. The optical waveguide 20a differs from conventional optical waveguides in that the cladding 24 has a break 28. This break 28 extends, as shown in FIG. 4, over the entire angular range. As the cladding 24 is broken, a light ray 30 emerges at the break 28. The break 28 is now arranged such that the light ray 30 emerges axially (referred to the axis of rotation 32 of the hollow shaft) and light is therefore transmitted to the receiver 32 on the mount 18.

Figure 5:
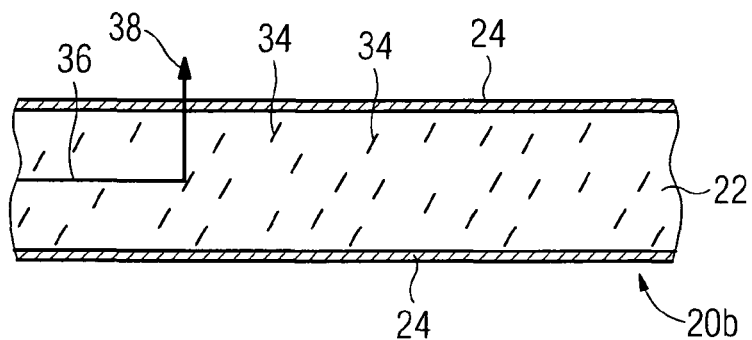
FIG. 5 illustrates a second embodiment of an optical waveguide in a longitudinal section through the optical waveguide and FIG. 6 and FIG. 7 illustrate a third embodiment of an optical waveguide in different cross-sections.

In the case of an optical waveguide 20b as shown in FIG. 5, the cladding 24 is unbroken. In contrast there is disposed in the optical waveguide core 22 a plurality of scattering centers 34 at which a light ray 36 is scattered. In this case the scattering centers 34 are oriented such that the light ray 36 is deflected in such a way that its deflection, as light ray 38, is essentially perpendicular to the cladding 24 so that it is not reflected by same, but escapes from the cladding 24.

The scattering centers 34 can be implemented in the optical waveguide core 22 by the application of heat using a laser.

Figure 6:
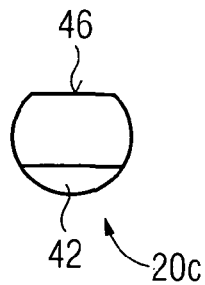
Figure 7:
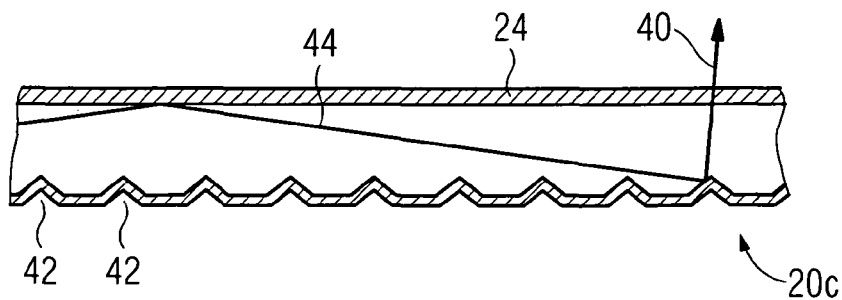

The perpendicular exit of a light ray 40 from a cladding 24 is also provided for in an optical waveguide 20c as shown in FIGS. 6 and 7. For this purpose a plurality of indentations 42 are made in the optical waveguide 20c, namely on the side opposite the nominal exit side of the light ray 40. Indentations 42 deflect a light ray 44 propagating in the optical waveguide 20c such that it is perpendicularly incident on the cladding 24, penetrate same and exits as light ray 40. In order to keep the exit cone small, the optical waveguide 20c is flattened on the exit side, cf. surface 46.

Now that three different embodiments 20a, 20b, 20c of the optical waveguide have been described with reference to FIGS. 3 to 7, attention will now be turned to the coupling of a light ray into the optical waveguide. In the present case this involves implementing the coupling-in of the light ray such that the optical waveguide 20 is not interrupted at any angle so that it would not emit light at that angle. It must be ensured that the optical waveguide emits light over its entire circumference.

Figure 8:
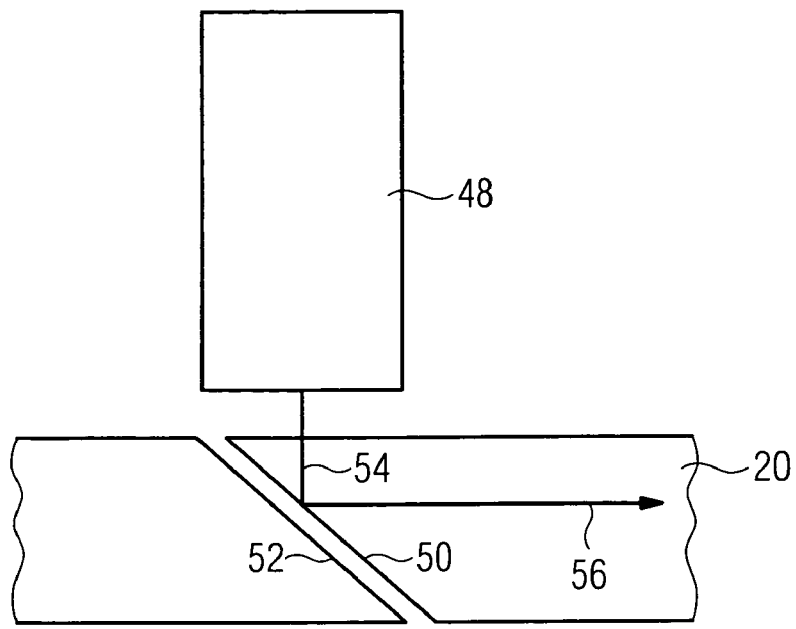
FIG. 8 to FIG. 10 illustrate different possibilities for coupling in optical signals for the optical waveguides.

FIG. 8 illustrates an embodiment in which a light source 48 is disposed radially outside the optical waveguide 20. In the present case, the optical waveguide 20 does not form a completely closed ring, but has an obliquely cut first end 50 and an obliquely cut second end 52, the ends 50 and 52 being brought together. The light source 48 transmits light perpendicularly, i.e. radially to the axis of rotation 32 of the hollow shaft 10, onto the obliquely cut end 50, and a light ray 54 emitted in this way is deflected at the obliquely cut end 50 to form the light ray 56 and propagates further in the optical waveguide 20.

Figure 9:
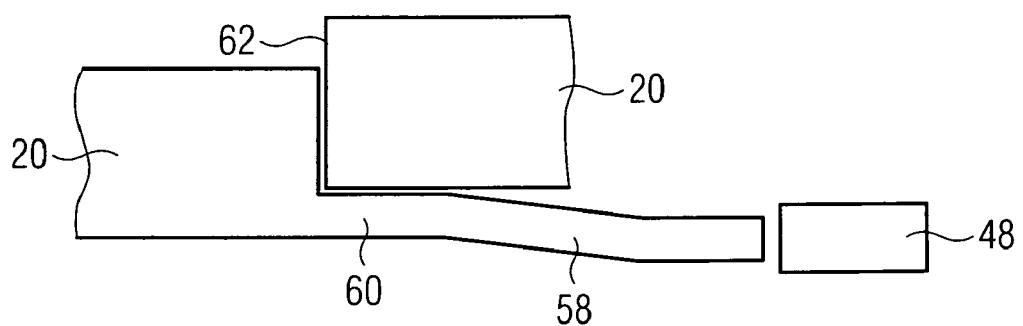

In the embodiment according to FIG. 9, an optical waveguide 20 has, at one end, a coupling-in branch 58 which has a much smaller cross-section than the optical waveguide 20 overall. The other end of the optical waveguide 20 abuts the first end of the optical waveguide 20 above the coupling-in branch 58. A light source 48 can now couple light into the coupling-in branch 58 such that it propagates in the entire optical waveguide 20 after passing through a transition region 60. At the other end of the optical waveguide 20, just a little light escapes at a projecting location 62, but most of the light is transmitted from one end of the optical waveguide 20 to the other so that the light can pass through the optical waveguide in a multiple manner.

Figure 10:
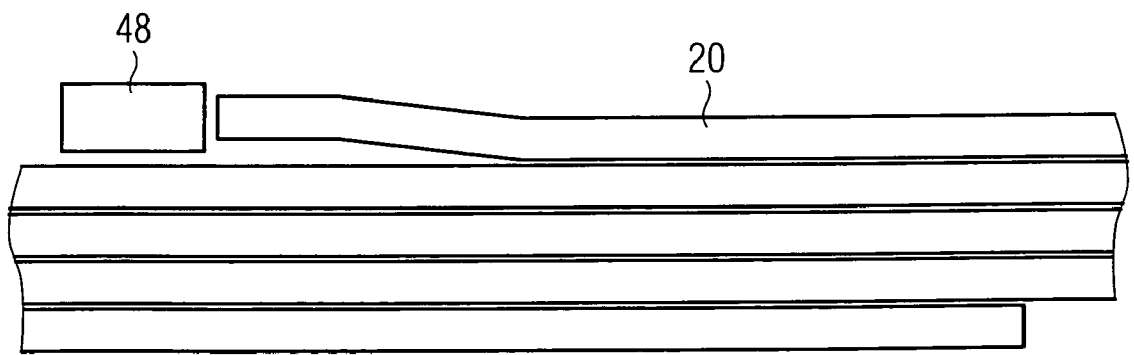

In an embodiment as shown in FIG. 10, an optical waveguide 20 is multiply wound over the circumference of a circle. This enables the optical waveguide 20 to have a different, in particular a smaller, cross-section than the optical waveguide from FIGS. 8 and 9. This means that no special coupling-in arm 58 as in FIG. 9 is required, but light can be coupled in over the entire cross-section of the optical waveguide 20 by a light source 48.

Figure 11:
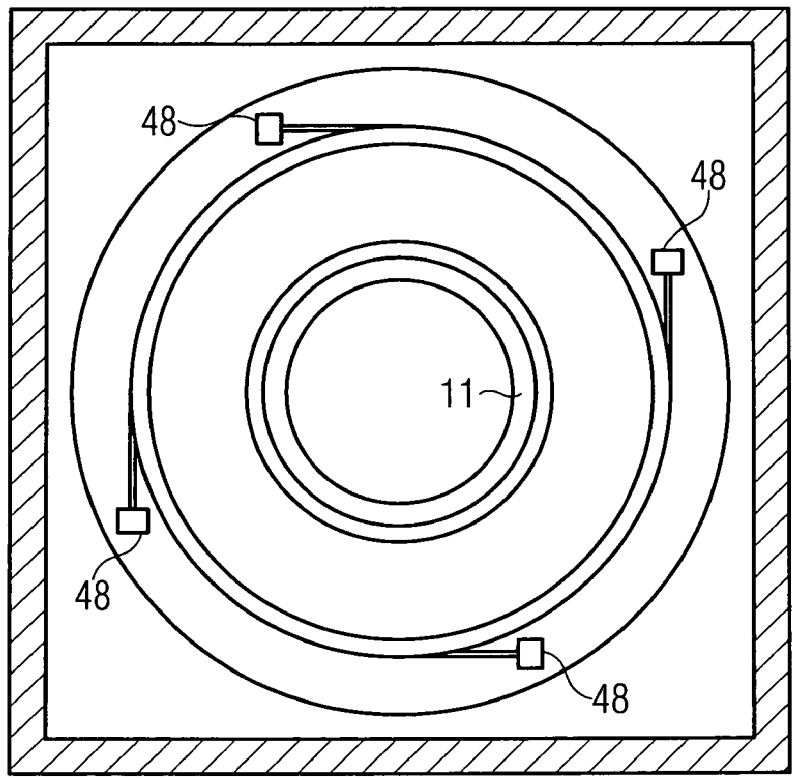
FIG. 11 shows a variant of the embodiment shown in FIG. 1

Unlike normal prior art practice, the invention only needs one light source, and it is the optical waveguide 20 that distributes the light evenly over its circumference. However, the invention does not exclude the possibility of using a plurality of light sources 48 which are distributed over the circumference. This is shown by way of example in FIG. 11.

Figure 12:
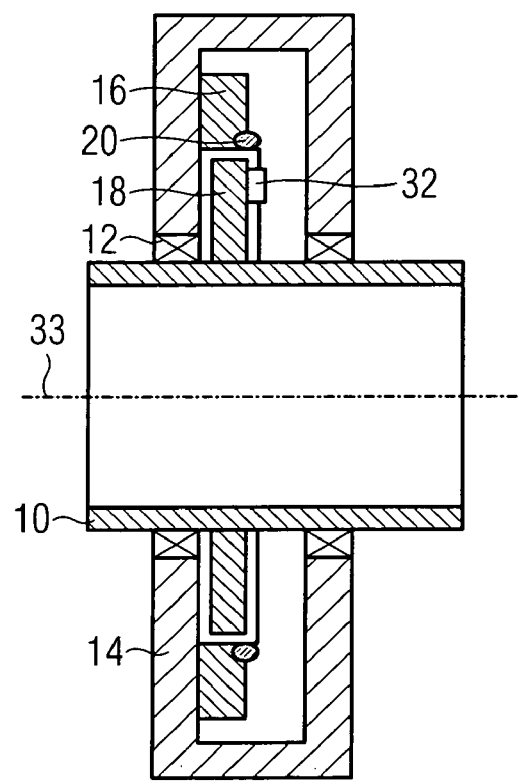
FIG. 12 shows an alternative embodiment of a machine.

FIG. 12 shows an alternative embodiment of the invention. It differs from the embodiment in FIG. 2 in that the fixed mount 16 radially encloses the mount 18 that rotates with the hollow shaft 10. The optical waveguide 20 emits light, not in the axial direction, but radially to the axis of rotation 32 of the hollow shaft to the receiver 32 on the mount 18. The embodiment according to FIG. 12 is of particularly short construction.

The invention claimed is:

1. A machine, comprising:
    a first machine part;
    a second machine part which rotates relative to the first machine part about an axis of rotation;
    an optical signal transmitting device disposed on the first machine part to transmit data signals, the optical signal transmitting device incorporating an annular optical waveguide disposed concentrically to the axis of rotation;
    an optical signal receiving device disposed on the second machine part for receiving optical signals,
    wherein the annular optical waveguide is implemented and disposed such that light coupled by a light source into the annular optical waveguide exits from the optical waveguide at any locations on its circumference in direction of the second machine part,
    wherein the optical waveguide has a core and a cladding, the material constituting the core having a lower refractive index than the material constituting the cladding, wherein the cladding is broken over the entire circumference of the optical waveguide ring.

2. The machine as claimed in claim 1, wherein the light is coupled in by a light source at a coupling point of the optical waveguide.

3. The machine as claimed in claim 1, wherein the optical signals are transmitted to the receiving device axially, referred to the axis of rotation, by the optical signal transmitting device.

4. The machine as claimed in claim 1, wherein a plurality of scattering centers are implemented in the optical waveguide which deflect the light in a predetermined direction.

5. The machine as claimed in claim 4, wherein the optical waveguide has indentations on its side facing away from the second machine part.

6. A machine, comprising:
    a first machine part;
    a second machine part which rotates relative to the first machine part about an axis of rotation;
    an optical signal transmitting device disposed on the first machine part to transmit data signals, the optical signal transmitting device incorporating an annular optical waveguide disposed concentrically to the axis of rotation;
    an optical signal receiving device disposed on the second machine part for receiving optical signals,
    wherein the annular optical waveguide is implemented and disposed such that light coupled by a light source into the annular optical waveguide exits from the optical waveguide at any locations on its circumference in direction of the second machine part,
    wherein a plurality of scattering centers are implemented in the optical waveguide which deflect the light in a predetermined direction.

7. A machine, comprising:
    a first machine part;
    a second machine part which rotates relative to the first machine part about an axis of rotation;
    an optical signal transmitting device disposed on the first machine part to transmit data signals, the optical signal transmitting device incorporating an annular optical waveguide disposed concentrically to the axis of rotation;
    an optical signal receiving device disposed on the second machine part for receiving optical signals,
    wherein the annular optical waveguide is implemented and disposed such that light coupled by a light source into the annular optical waveguide enters the annular optical waveguide at any locations on its circumference from the direction of the second machine part,
    wherein the optical waveguide has a core and a cladding, the material constituting the core having a lower refractive index than the material constituting the cladding, and wherein the cladding is broken over the entire circumference of the optical waveguide ring.

8. The machine as claimed in claim 7, wherein the optical signals are transmitted to the receiving device axially, referred to the axis of rotation, by the optical signal transmitting device.

9. The machine as claimed in claim 7, wherein a plurality of scattering centers are implemented in the optical waveguide which deflect the light in a predetermined direction.

10. The machine as claimed in claim 9, wherein the optical waveguide has indentations on its side facing away from the second machine part.

* * * * *